United States Patent Office 3,337,648
Patented Aug. 22, 1967

3,337,648
GRAFT COPOLYMER COMPRISING THE REACTION PRODUCT OF A CARBOXY-TERMINATED CONJUGATED DIENE POLYMER WITH A VINYL AROMATIC HYDROCARBON AND A LACTAM
Rene Aelion, Groton, Mass., Frederick R. Eirich, Eastchester, N.Y., and Willard M. Sims, Leominster, Mass., assignors to Foster Grant Co., Inc., Leominster, Mass., a corporation of Delaware
No Drawing. Filed Jan. 27, 1966, Ser. No. 523,255
7 Claims. (Cl. 260—857)

This application is a continuation-in-part of Ser. No. 405,824, filed Oct. 22, 1964.

This invention concerns a new type of graft polymer formed from a linear polyamide-forming lactam having at least 6 atoms in the lactam ring, and a copolymer of a vinyl compound with an unsaturated carboxy-containing polymeric hydrocarbon.

More particularly this invention relates to these polymers containing a relatively small ratio of carboxylic acid groups to vinyl compound content. These latter polymers are characterized by the carboxy group being positioned at the terminal portions of the unsaturated hydrocarbon polymer. The broad class of graft polymers are desirable because of their gel-free nature and their ability to readily form fibers.

Various attempts have been made to improve lactam polymers. Investigators have attempted to form graft lactam polymers and the like, but the resultant polymers were of little commercial interest, largely due to their gelled or cross-linked structure. In the above parent application, there are described unique, tough thermoplastic graft polymers of lactam and vinyl aromatic compound-unsaturated carboxylic acid copolymers which are substantially free of cross-linking and gelling, and which can be prepared by forming a backbone polymer of an olefinically unsaturated monocarboxylic acid having 3 to 20 carbon atoms and a monovinyl aromatic compound wherein the ratio of monovinyl aromatic compound to monocarboxylic acid is 15:1 to 100:1, preferably 30:1 to 80:1.

It has now been found that polymers of superior quality can be produced by initially forming a backbone polymer of a monovinyl aromatic compound and a carboxy terminated unsaturated hydrocarbon polymer, prior to subsequent graft polymerization with lactams. The carboxy terminated unsaturated hydrocarbon polymer has an average molecular weight of 500 to 50,000, preferably 1,000 to 10,000. By virtue of the unsaturated hydrocarbon polymer having carboxy groups in terminal positions on the polymer chain, the carboxy groups are much more accessible as sites for the grafting on of polycaprolactam chains and accordingly relatively few carboxy groups are necessary to form the graft polymer.

The present polymers are characterized by a molar ratio of vinyl aromatic compound to unsaturated acid in the range of 500:1 to 10,000:1, preferably 1,000:1 to 5,000:1. The backbone vinyl aromatic compound graft polymer to be reacted with lactam normally will contain 0.5 to 10, preferably to 1 to 5 weight percent carboxy terminated unsaturated hydrocarbon polymer, based on the weight of the vinyl aromatic compound employed.

The ultimate composition of the lactam graft polymers will comprise 95.0 to 99.9% by weight of monovinyl aromatic compound (e.g., styrene) and lactam, with the balance being the carboxy containing unsaturated hydrocarbon polymer. The monovinyl aromatic compound will comprise 5 to 50% by weight, preferably 20–40% by weight, based upon the total weight of lactam incorporated into the graft polymers. Economic considerations have an important bearing upon the upper concentration of carboxy containing unsaturated hydrocarbon polymer utilized.

The substantially gel-free, crosslink-free nature of these polymers is evidenced by their solubility in phenol-type solvents such as m-cresol, and their ability to be formed into highly oriented fibers, the latter further illustrating a substantially true graft polymer rather than blends to have been formed. The polymers show good impact and elongation properties, are of suitable viscosity for forming fibers, and offer good water resistance.

The present invention offers several advantages over the polymers described in parent application Ser. No. 405,824. For example, the desired polymer products, and control of the polymer molecular weight and of the grafting in the products are more readily obtained.

Another advantage in the use of the carboxy terminated unsaturated hydrocarbon is that the carboxy groups have low steric hindrance and have a high regularity of spacing.

A significant advantage is that the product has a superior resilience.

The lactams suitable for the practice of the present invention can be characterized as linear polyamide-forming lactams which have at least 6 atoms in the lactam ring. The lactam preferably has 7 to 13 atoms in the lactam ring. Caprolactam is especially preferred. Other specific utilizable lactams include the following:

2-oxo-pentamethylenimine,
2-oxo-hexamethylenimine (alternatively called caprolactam),
2-oxo-heptamethylenimine,
2-oxo-octamethylenimine,
2-oxo-decamethylenimine.

The monovinyl aromatic compounds which can be employed in the practice of this invention include styrene, alpha-methylstyrene, vinylnaphthalene, and derivatives thereof which are free of nuclear substituents which interfere with the production of the desired polymers of this invention.

Specific examples of such monovinyl aromatic compounds include p-methylstyrene, m-methylstyrene, p-ethylstyrene, p-isopropylstyrene, o-chlorostyrene, p-chlorostyrene, ar-dimethylstyrene, ar-dichlorostyrene, ar-methyl-ar-ethylstyrene, ar-methyl-ar-chlorostyrene, beta-vinylnaphthalene, ar-diethylstyrene, p-fluorostyrene, p-bromostyrene, ar-methyl-ar-isopropylstyrene, and the like. The preferred vinyl aromatic compound is styrene.

The carboxy terminated unsaturated hydrocarbon polymers suitable for the practice of the present invention are copolymerizable with the vinyl aromatic compounds and contain two or more carboxy groups. At least one and normally two carboxy groups (one at each end) are positioned at the terminal portions of the polymer chain. The polymer may contain a relatively minor number of carboxy groups at the intermediate portion of the chain but not sufficient to cause substantial cross-linking. The carboxy terminated unsaturated hydrocarbon polymer generally contains over 40, suitably over 80 carbon atoms, and normally has a molecular weight of 500 to 50,000, preferably 1,000 to 10,000. Particularly preferred are polymers of a repeating $C_4$ to $C_6$ conjugated diene, especially a polybutadiene polymer.

The novel polymers of the present invention are preferably prepared by the following process, which ensures uniform distribution of components as well as a substantially gel-free graft polymer product. The present process is characterized by a simultaneous addition of vinyl aromatic compound and the carboxy terminated unsaturated hydrocarbon polymer to a reactor containing lactam as the reaction medium. The addition should be regulated to provide the required uniformity of randomness of the vinyl aromatic compound in the formed backbone polymer. The vinyl aromatic compound polymerization and grafting of the resulting polymer to the carboxy terminated unsaturated hydrocarbon polymer to form the backbone polymer is carried out under mild conditions, e.g. temperatures from 70 to 150° C., preferably 80 to 100° C.

Peroxide catalysts or other known initiators for polymerizing the vinyl aromatic compound in the presence of the carboxy terminated unsaturated hydrocarbon polymer to form the backbone polymer can be used. Also, thermal initiation or other suitable initiations can be employed. The polymerization is preferably carried out to substantial completeness, e.g. 99+% polymerization of monomers. Thereafter, any additional required lactam and a suitable catalyst for the graft polymerization such as water, aminocaproic acid or an organic compound which liberates water under reaction conditions (e.g. hexamethylene diammonium adipate) is added and the reaction conditions are adjusted to cause the graft polymerization. If water is employed as the catalyst, ordinarily about 0.2 to 5%, based on the weight of the lactam, is employed.

Generally, temperatures will be increased from 200 to 300° C., preferably 250 to 275° C. to effect lactam polymerization and grafting of the resulting polymer to the backbone polymer, particularly when the lactam is caprolactam. The amount of catalyst for this polymerization reaction ordinarily is about 0.2 to 5%, based on the weight of lactam. However, the amount of suitable organic compound which liberates water is dependent upon the quantity and rate at which the water is liberated. It is possible also under many reaction conditions to add the lactam catalysts at the beginning of the polymerization to form the backbone polymer.

Alternately, the reaction between the lactam and the backbone polymer can be run more quickly at super atmospheric pressures, 20 or more p.s.i. The advantage of utilizing higher pressures is that a reduction of reaction time is obtained.

The vinyl aromatic compound, e.g. styrene, and the carboxy terminated unsaturated hydrocarbon polymer, e.g., polybutadiene dicarboxylic acid, should be fed to the polymerization zone containing molten lactam, e.g. caprolactam, at a substantially constant rate; they may either be mixed in a separate vessel prior to charging or introduced into the polymerization zone as a two-feed stream at controlled rates. In order to initiate the reaction and start the formation of free radicals, about 5 to 15, e.g. 10 percent of the polymerization charge may be first added and reacted for a period of, e.g., 1 to 5 hours, preferably 2 to 3 hours prior to feeding the remainder of the charge at a controlled rate.

A suitable catalyst normally of the peroxide type, e.g. lauroyl peroxide, acetyl peroxide, benzoyl peroxide, t-butyl hydroperoxide, t-butyl peracetate, caprylyl peroxide, dicumyl peroxide, methyl ethyl ketone peroxide, generally in amounts of 0.25 to 2 wt. percent based on total vinyl aromatic compound weight, is present during this initial polymerization conducted under mild conditions not conducive to lactam polymerization. The catalyst alternatively can be a suitable azo catalyst such as azobisisobutyronitrile. The catalyst can be introduced with a mixed stream of monomers, an individual monomer stream, or separately.

After formation of the backbone polymer, the remainder of the lactam and a suitable catalyst, normally water in amounts of 0.2 to 5 wt. percent based on lactam weight is introduced into the reaction vessel and temperatures raised to above 200° C. to effect polymerization of the lactam and grafting of the lactam polymer to the backbone polymer. In general, about equal quantities of lactam and vinyl aromatic compound can be employed in the initial copolymerization step, with the remaining quantity of lactam being added after the initial polymerization. An alternate way is to mix all the constituents together and polymerize in two steps one at low temperatures to polymerize the vinyl aromatic compound and graft the resulting polymer to the unsaturated hydrocarbon polymer to form the backbone polymer and one at high temperatures to polymerize the lactam and graft the resulting polymer to the backbone polymer.

While it is preferred to prepare the unique polymers of the present invention by the sequence of process steps heretofore described, other processes, e.g. aqueous suspension or emulsion, can be employed provided that the backbone polymers of monoviyl aromatic compound and carboxy terminated unsaturated hydrocarbon polymer are initially separately prepared so as to have requisite uniform grafting. Thereafter, desired amounts of the preformed polymer and lactam are dissolved and are reacted to carry out the final graft polymerization.

The various aspects and modifications of the present invention will be made more clearly apparent from the following description and accompanying examples.

*Example 1*

The following illustrates the formation of a typical polymer of the present invention wherein the carboxy terminated unsaturated hydrocarbon polymer component is a polybutadiene dicarboxylic acid sold under the trademark of "Butarez" by the Phillips Petroleum Company (Bartlesville, Oklahoma). The carboxy terminated polymer is a liquid butadiene polymer having a molecular weight of about 5,000 (weight average molecular weight) having a carboxy group at each end of the polymer.

Use of 30% styrene, 4.0% polybutadiene dicarboxylic acid composition (based on styrene).

| Charge: | Parts by weight |
|---|---|
| Styrene | 2400 |
| Polybutadiene dicarboxylic acid | 96 |
| Caprolactam | 5600 |
| Tertiary butyl peracetate | 24.4 |
| Water | 168 |

Procedure:
(1) 2400 parts by weight of molten caprolactam is added to a resin kettle under nitrogen at 90° C.
(2) In a separate flask styrene, polybutadiene dicarboxylic acid, and initiator (tertiary butyl peracetate) are mixed together.
(3) 240 parts by weight of the monomer mixture is added to the caprolactam, and the resultant mixture heated for 3 hours at 90° C.
(4) The remainder of the monomer mixture is added dropwise over a period of 5–6 hours.
(5) After all the monomer mixture is added, heating is continued for an additional 5 hours.
(6) 3200 parts by weight of additional molten caprolactam and 168 g. water are thereafter added.
(7) The entire mixture is then refluxed 5 hours at 245° C.
(8) At the end of 5 hours reflux conditions are removed and the reactants swept with nitrogen and the reaction was then continued for an additional 15 hours at 260° C.

The resultant polymer has a relative viscosity of 2.25, is soluble in m-cresol; and is essentially gel free, tough, and fiber forming.

*Example 2*

Use of 20% styrene, 1.31% polybutadiene dicarboxylic acid composition (based on styrene).

| Charge: | Parts by weight |
|---|---|
| Styrene | 1600 |
| Polybutadiene dicarboxylic acid | 21 |
| Caprolactam | 6400 |
| Tertiary butyl peracetate | 16.2 |
| Water | 192 |

Procedure:
(1) 1600 parts by weight of molten caprolactam is added to a resin kettle under nitrogen at 90° C.
(2) In a separate flask styrene, polybutadiene dicarboxylic acid, and initiator (tertiary butyl peracetate) are mixed.
(3) 160 parts by weight of the monomer mixture is added to the caprolactam and the resultant mixture is heated for 3 hours at 90° C.
(4) The remainder of the monomer mixture is added drop-wise over a period of 5–6 hours.
(5) After all of the monomer is added, heating is continued for an additional 5 hours.
(6) 4800 parts by weight of additional molten caprolactam and 192 parts by weight of water are thereafter added.
(7) The entire mixture is then refluxed 5 hours at 245° C.
(8) At the end of 5 hours, reflux conditions are removed, the reactants are swept with nitrogen, and the reaction is continued for an additional 15 hours at 260° C.

*Example 3*

Use of a 40% styrene, 3.0% polybutadiene dicarboxylic acid composition (based on styrene).

Charge: Parts by weight
  Styrene _____ 3200
  Polybutadiene dicarboxylic acid _____ 96
  Caprolactam _____ 4800
  Tertiary butyl peracetate _____ 33
  Water _____ 168

Procedure:
(1) 3200 parts by weight of molten caprolactam is added to a resin kettle under nitrogen 90° C.
(2) In a separate flask styrene, polybutadiene dicarboxylic acid, and initiator (tertiary butyl peracetate) are mixed.
(3) 330 parts by weight of the monomer mixture are added to the caprolactam and the resultant mixture is heated for 3 hours at 90° C.
(4) The remainder of the monomer mixture is added drop-wise over a period of 5–6 hours.
(5) After all of the monomer mixture is added, heating is continued for an additional 5 hours.
(6) 1600 parts by weight of additional molten caprolactam and 192 parts by weight of water are thereafter added.
(7) The entire mixture is then refluxed 5 hours at 245° C.
(8) At the end of 5 hours reflux conditions are removed, the reactants are swept with nitrogen, and the reaction is continued for an additional 15 hours at 260° C.

*Example 4*

This illustrates the use of an alternative reaction procedure using pressure.

Charge: Parts by weight
  Styrene _____ 2400
  Polybutadiene dicarboxylic acid _____ 96
  Caprolactam _____ 5600
  Tertiary butyl peracetate _____ 24.4
  Water _____ 168

Procedure: (The same as for Example 1, steps 1 through 6.)
(7) Heat reaction mixture under pressure for 3 hours at 245° C.
(8) Stop agitation and depressurize reactor slowly to atmospheric pressure.
(9) Turn on agitator again, sweep reactants with nitrogen, and continue reaction for an additional 15 hours at 260° C.

*Example 5*

Addition of styrene, polybutadiene dicarboxylic acid, and initiator in bulk to the caprolactam.

Charge: Parts by weight
  Styrene _____ 2400
  Polybutadiene dicarboxylic acid _____ 96
  Caprolactam _____ 5600
  Tertiary butyl peracetate _____ 24.4
  Water _____ 168

Procedure:
(1) 2400 parts by weight of molten caprolactam is added to a resin kettle under nitrogen at 90° C.
(2) In a separate flask styrene, polybutadiene dicarboxylic acid, and initiator (tertiary butyl peracetate) are mixed. The entire contents are added to the molten caprolactam.
(3) React for 3 hours at 90° C. and another 4 hours at 120° C.
(4) 3200 parts by weight of additional molten caprolactam and 168 g. water are thereafter added.
(5) The entire mixture is then refluxed 5 hours at 245° C.
(6) At the end of 5 hours reflux conditions are removed, the reactants are swept with nitrogen, and the reaction continued for an additional 15 hours at 260° C.

*Examples 6–8*

The procedure of Example 1 is repeated but the amounts of carboxy terminated polybutadiene resin (Butarez) is varied to form lactam graft polymers having 2.0, 3.0, 4 and 5 weight percent carboxy terminated polybutadiene based on the styrene.

The properties of the resultant graft polymers and reaction properties are as follows:

TABLE A

| | Percent Carboxy Terminated Unsaturated Polymer in Styrene Backbone | | | |
|---|---|---|---|---|
| Reaction Properties | 2.0 | 3.0 | 4.0 | 5.0 |
| Relative Viscosity | 2.08 | 2.66 | 2.25 | 2.18 |

*Examples 9–10*

The procedure of Example 4 is repeated but the amounts of carboxy terminated polybutadiene resin (Butarez) are varied to form lactam graft polymers containing from 1.3 to 5 weight per cent carboxy terminated polymeric component in the styrene graft, thereafter reacted with caprolactam to form a 40% styrene graft to polycaprolactam.

The properties of the resultant polymer and reaction conditions are as follows:

TABLE B

| | Percent Carboxy Terminated Unsaturated Polymer in Styrene Backbone | |
|---|---|---|
| Reaction Properties | 1.3 | 5.0 |
| Relative Viscosity | 2.12 | 1.81 |

The work described in the examples above can be repeated using a variety of equivalent materials. For instance, 20% of the styrene used in Example 1 can be replaced by alpha-methylstyrene. Similarly the styrene content of Examples 2 and 3 can be replaced on a weight basis with chlorostyrene and para-methylstyrene, respectively. Likewise, the caprolactam of Example 4 can be replaced with caprylactam and the caprolactam of Example 5 can be replaced with dodecalactam with comparable results.

Various modifications can be made to the present invention. For example, numerous modifications and changes can be made in the reaction conditions, reactants, and the like without departing from the inventive concept. The invention is best defined by the claims which follow.

What is claimed is:
1. A graft copolymer comprising a carboxy terminated polymer having repeating units resulting from the polymerization of a $C_4$ to $C_6$ conjugated diene having grafted thereon a plurality of polymer chains of a monovinyl aromatic hydrocarbon and at least one polymer chain of a lactam having at least six atoms in the ring, wherein the carboxy terminated polymer has a molecular weight of 500 to 50,000, the molar ratio of monovinyl aromatic hydrocarbon to carboxy terminated polymer falls in the range of 500:1 to 10,000:1, and the graft copolymer contains 5 to 50 percent by weight of monovinyl aromatic hydrocarbon based on the total weight of lactam incorporated in the graft copolymer.

2. The polymer of claim 1 wherein the molar ratio of monovinyl aromatic hydrocarbon to carboxy terminated polymer is 1000:1 to 5,000:1.

3. The polymer of claim 1 wherein the lactam is caprolactam and the monovinyl aromatic hydrocarbon is styrene.

4. The polymer of claim 1 wherein the carboxy terminated polymer is carboxy terminated polybutadiene.

5. A thermoplastic fiber-forming graft copolymer of caprolactam and a backbone polymer of a carboxy terminated polybutadiene having a plurality of polystyrene chains grafted thereon, wherein the molar ratio of styrene to the carboxy terminated polybutadiene is from about 500:1 to about 10,000:1, the graft copolymer having a combined weight of incorporated styrene and caprolactam in the range of from about 95.1 to about 99.9%.

6. The polymer of claim 5 wherein the molar ratio of styrene to carboxy terminated polybutadiene ranges from 1,000:1 to 5,000:1 and the carboxy terminated polybutadiene has an average molecular weight of 1,000 to 10,000.

7. The polymer of claim 6 wherein the carboxy terminated polybutadiene has an average molecular weight of about 5,000.

No references cited.

MURRAY TILLMAN, *Primary Examiner.*

P. LIEBERMAN, *Assistant Examiner.*